United States Patent
Biran et al.

(10) Patent No.: US 6,829,647 B1
(45) Date of Patent: Dec. 7, 2004

(54) SCALEABLE HARDWARE ARBITER

(75) Inventors: Giora Biran, Haifa (IL); Claudiu Schiller, Haifa (IL); Tai Sostheim, Kiryat Tivan (IL)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 09/591,216

(22) Filed: Jun. 9, 2000

(51) Int. Cl.$^7$ .......................... G06F 15/16; H04L 12/28
(52) U.S. Cl. ....................... 709/229; 370/412; 370/416
(58) Field of Search ........................ 709/229, 103–105, 709/232–235, 238, 240, 242, 244; 370/236, 416, 412, 415

(56) References Cited

U.S. PATENT DOCUMENTS

| | | | | |
|---|---|---|---|---|
| 5,408,463 | A | * | 4/1995 | Merchant et al. ........... 370/218 |
| 5,893,162 | A | * | 4/1999 | Lau et al. .................... 711/153 |
| 6,046,982 | A | * | 4/2000 | Ozveren et al. ............ 370/232 |
| 6,240,066 | B1 | * | 5/2001 | Nagarajan et al. .......... 370/230 |
| 6,445,680 | B1 | * | 9/2002 | Moyal ......................... 370/236 |
| 6,625,122 | B1 | * | 9/2003 | Joffe ........................... 370/230 |
| 6,633,568 | B1 | * | 10/2003 | Han et al. ................. 370/395.4 |
| 6,667,984 | B1 | * | 12/2003 | Chao et al. .................. 370/414 |

OTHER PUBLICATIONS

Badran et al. "Head of Line Arbitration in ATM Switches with Input–Output Buffering and Backpressure Control", Global Telecommunications Conference 1991 (GLOBECOM '91: Countdown to the New Millennium), Dec. 2–5, 1991, pp. 347–351, vol. 1.*

Li, Jie et al. "Load Balancing Problems for Multiclass Jobs in Distributed/Parallel Computer Systems". IEEE Transactions on Computers, vol. 47, No. 3, Mar. 1998, pp. 322–332.*

Li, Jie et al. "A Decomposition Algorithm for Optical Static Load Balancing in Tree Hierarchy Network Configurations". IEEE Transactions on Parallel and Distributed Systems, vol. 5, No. 5, May 1994, pp. 540–548.*

* cited by examiner

Primary Examiner—David Wiley
Assistant Examiner—George Neurauter
(74) Attorney, Agent, or Firm—Darby & Darby (57) ABSTRACT

An arbiter which arbitrates between a plurality of clients generating requests for access to a resource in a computing environment, including a memory which includes for each of the plurality of clients a request register, which is adapted to record the respective client's access requests, and a next-client pointer, which is adapted to record an identification of another one of the clients making a subsequent request to access the resource, so as to form a linked list of the requests. The arbiter further includes logic circuitry which is adapted to decide, responsive to the linked list, which of the plurality of clients is given access to the resource.

24 Claims, 7 Drawing Sheets

SCALEABLE HARDWARE ARBITER

FIELD OF THE INVENTION

The present invention relates generally to decision-making logic devices in a computing system, and specifically to arbitration devices which arbitrate between clients within the system.

BACKGROUND OF THE INVENTION

An arbiter is a computing device which is used to select one from a plurality of clients requesting access to a specific computing resource. The arbiter receives a plurality of requests from the clients, and chooses one of the requests to have access to the resource. The client whose request is chosen to have access is herein termed the arbitration-winning client. Arbiters known in the art implement a variety of different arbitration schemes, including priority schemes wherein different clients are assigned different fixed priorities.

For example, in one common type of arbitration system, incoming requests are logged in registers. Each client is assigned a register in the arbiter, so that a specific register holds pending requests for that client. Combinatorial logic is used to define the next request to be served at any time, using priority schemes as are known in the art. The logic acts as a bottleneck for the arbiter, and the size of the logic grows in proportion to the square of the number of clients.

Another type of arbitration system simply uses a first-in first-out (FIFO) memory device. Each new request is stored at the tail of the device, and the request at the head of the FIFO receives the service. This system is limited by the size of the FIFO, which depends on the number of requests, rather than the number of clients. Depending on the arbitration system, the number of requests can be orders of magnitude larger than the number of clients.

Other arbitration schemes include round-robin and time-sharing schemes. Hardware arbiters known in the art typically require combinatorial logic paths whose length, and thus the size of the logic, is directly proportional to the square of the number of clients utilizing the resource. As the size of the logic increases, the time for arbitration also increases. Depending on the application, arbiters in a computing system may receive requests from thousands of clients, necessitating arbiters having large logic sizes.

SUMMARY OF THE INVENTION

It is an object of some aspects of the present invention to provide an arbiter which utilizes reduced logic size and which is able to arbitrate efficiently between large numbers of clients.

It is a further object of some aspects of the present invention to provide an arbiter comprising logic circuitry whose size is substantially independent of the number of clients using the arbiter.

It is another object of some aspects of the present invention to provide an arbiter wherein the time taken to perform an arbitration is substantially independent of the number of clients using the arbiter.

It is yet a further object of some aspects of the present invention to provide an arbiter utilizing a memory whose size scales as substantially less than the square of the number of clients.

In preferred embodiments of the present invention, a hardware-based arbiter which arbitrates between a plurality of clients in a computing environment is implemented as a linked-list device. The plurality of clients are resident in a memory of the computing environment, and produce multiple requests for use of a specific resource of the environment. As the plurality of clients produce requests for the resource, the requests are directed to the arbiter. For each client requesting use of the resource, the arbiter updates a number-of-requests value and a next-client-to-use-the-resource pointer, hereinafter termed a next-client pointer, and enters these updated parameters into a table comprised in the arbiter. The next-client pointers link their respective clients in a uni-directional list. At times when the resource is available, the arbiter utilizes the list to arbitrate between the plurality of clients and so generate an arbitration-winning client, which client is given access by the arbiter to the resource.

The arbiter manages the table by arbiter-specific logic circuitry incorporated into the arbiter, the size of which logic is relatively small and is independent both of the number of clients and of the number of requests. The size of the arbiter is thus roughly equal to the size of the table generated by the arbiter. The size of the table is directly proportional to the number of clients requesting use of the resource, herein termed N, and to the size of the entries of the table. The size of the entries is of the order of $\log_2(N)$, so that the total size of the arbiter is of the order of $N \cdot \log_2(N)$. Thus the size of the arbiter, especially for large values of N, is significantly smaller than arbiters known in the art which use combinatorial logic. Furthermore, since the timing of arbitration performed by the arbiter is a function of the size of the logic circuitry, the timing is substantially independent of the number of clients and the number of requests from the clients. While linked lists have been used in software-based arbitration, the present invention is the first practical implementation of a linked-list structure in hardware. It thus provides a substantially faster and more economical solution to the problem of arbitration among large numbers of clients than has heretofore been known in the art.

In some preferred embodiments of the present invention, one or more input devices are added to the arbiter in order to separate requests which would otherwise arrive substantially simultaneously at the arbiter.

In some preferred embodiments of the present invention, requests from different clients may be assigned to more than one priority level. Additional sets of pointers, according to the number of priority levels, are incorporated in the arbiter. The additional sets of pointers enable the arbiter to arbitrate between the different priority requests.

There is therefore provided, according to a preferred embodiment of the present invention, an arbiter which arbitrates between a plurality of clients generating requests for access to a resource in a computing environment, including:

a memory, including for each of the plurality of clients:
  a request register, which is adapted to record the respective client's access requests; and
  a next-client pointer, which is adapted to record an identification of another one of the clients making a subsequent request to access the resource, so as to form a linked list of the requests; and logic circuitry which is adapted to decide, responsive to the linked list, which of the plurality of clients is given access to the resource.

Preferably, the memory includes at least one list-terminating pointer which indicates an end of the linked list.

Preferably, the at least one list-terminating pointer includes a tail pointer which indicates a last client in the linked list.

Preferably, the at least one list-terminating pointer includes a head pointer which indicates a first client in the linked list, and the logic circuitry is operative to decide, responsive to the head pointer, which of the plurality of clients is given access to the resource.

Preferably, the logic circuitry is operative to check whether a client requesting access to the resource has a pending access request, and to update a record of the number of pending access requests recorded in the respective register responsive to the check.

Preferably, the logic circuitry is operative to check whether the resource is available, and to allocate the resource responsive to the check.

Preferably, the arbiter includes at least one buffer wherein requests from a specific client are stored before being recorded in the respective request register.

Further preferably, the arbiter includes a first-in first-out memory wherein requests from the plurality of clients are stored before being transferred sequentially to the memory and the logic circuitry.

Preferably, the memory includes:
for at least some of the clients, a priority flag which is adapted to record a priority for access to the resource for the at least some clients; and
at least one list-terminating pointer for the priority, which indicates an end of the linked list for the at least some clients.

Preferably, the logic circuitry is adapted to decide, responsive to the linked list and the priority flag, which of the clients is given access to the resource.

Further preferably, the logic circuitry is of a size that is substantially independent of the number of clients served by the arbiter, and the circuitry is adapted to decide, responsive to the recorded requests, which of the plurality of clients is given access to the resource.

Preferably, a size of the memory scales as a product of the number of clients and a logarithm of the number of clients.

There is further provided, according to a preferred embodiment of the present invention, an arbiter serving a plurality of clients that generate requests for access to a resource in a computing environment, including:
a memory, including a respective register assigned to each of the plurality of clients, which register is adapted to record the respective client's access requests; and
logic circuitry, of a size that is substantially independent of the number of clients served by the arbiter, which circuitry is adapted to decide, responsive to the recorded requests, which of the plurality of clients is given access to the resource.

Preferably, the size of the memory scales as a product of the number of clients and a logarithm of the number of clients.

There is further provided, according to a preferred embodiment of the present invention, a method for arbitrating between a plurality of clients generating requests for access to a resource in a computing environment, including:
for each of the plurality of clients, recording the client's access requests in a respective, dedicated memory register;
recording for each of the clients, responsive to the requests, a next-client pointer to a subsequent one of the clients requesting the resource, so as to form a linked list of the clients; and
giving the clients access to the resource responsive to the linked list.

Preferably, recording the next-client pointer includes pointing to an end of the linked list with a list-terminating pointer.

Preferably, pointing to the end of the linked list includes pointing to a last client in the linked list with a tail pointer.

Further preferably, pointing to the end of the linked list includes pointing to a first client in the linked list with a head pointer, and giving the clients access to the resource includes giving the clients access to the resource responsive to the head pointer.

Preferably, recording the client's access requests includes checking if a client requesting access to the resource has a pending request, and updating the memory register responsive to the check.

Preferably, giving the clients access includes checking whether the resource is available, and allocating the resource responsive to the check.

Preferably, recording the client's access requests includes providing at least one buffer and storing the requests from the client in the buffer prior to recording the client's access requests.

Preferably, giving the clients access includes assigning priorities to at least some of the clients, and forming a linked list of the prioritized clients.

Further preferably, giving the clients access to the resource includes deciding, responsive to the assigned priorities and the linked list, which of the clients is given access to the resource.

There is further provided, according to a preferred embodiment of the present invention, a method for arbitrating between a plurality of clients generating requests for access to a resource in a computing environment, including:
for each of the plurality of clients, recording the client's access requests;
providing logic circuitry of a size that is substantially independent of the number of the plurality of clients; and
utilizing the logic circuitry to decide, responsive to the recorded requests, which of the plurality of clients is given access to the resource.

The present invention will be more fully understood from the following detailed description of the preferred embodiments thereof, taken together with the drawings, in which:

DETAILED DESCRIPTION OF PREFERRED EMBODIMENTS

Figure 1:
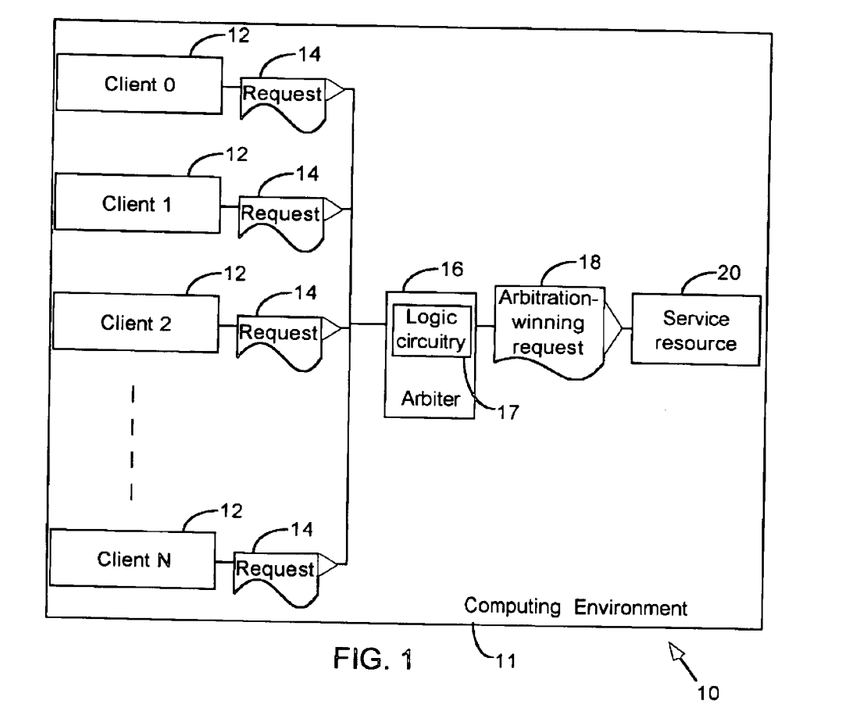
FIG. 1 is a schematic block diagram of an arbitration system, according to a preferred embodiment of the present invention.

Reference is now made to FIG. 1, which is a schematic block diagram of an arbitration system 10, according to a preferred embodiment of the present invention. Arbitration system 10 comprises a plurality of clients 12 which are given access to a service resource 20 by an arbiter 16. Arbitration system 10 is implemented in a computing environment 11, wherein the plurality of clients comprise respective elements of the environment, such as applications, or procedures generated by applications, which are resident in a system memory of the environment. Most preferably, service resource 20 is also resident in a system memory of the environment. Each of the plurality of clients 12 generates a plurality of requests 14 for access to service resource 20, which requests are transmitted to arbiter 16. In system 10, requests 14 are assumed to have equal priorities, and to be input from their respective clients at times sufficiently different so that arbiter 16 receives one request at a time.

Arbiter 16 comprises logic circuitry 17 which, inter alia, processes requests 14 to generate an arbitration-winning request 18 as the output of the arbiter. The client transmitting arbitration-winning request 18, herein termed the arbitration-winning client, is given access to service resource 20. The arbitration-winning client retains access to resource 20 until the service provided by the resource is completed, at which time arbiter 16 performs a new arbitration. It will thus be understood that the process illustrated by FIG. 1 is a dynamic process, so that clients 12 are continually generating requests 14, and arbitration-winning request 18 is being continually updated by arbiter 16. Arbiter 16 is most preferably implemented as a custom-built device such as an application specific integrated circuit (ASIC). Alternatively, arbiter 16 is implemented as one or more discrete devices, or as a combination of discrete and/or semi-custom and/or custom devices.

Figure 2A:
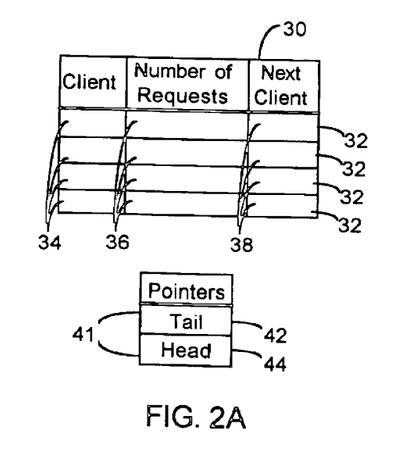
FIG. 2A is a schematic diagram of a data structure table implemented in an arbiter of the arbitration system of FIG. 1, according to a preferred embodiment of the present invention.

FIG. 2A is a schematic diagram of a data structure table 30 implemented in arbiter 16, according to a preferred embodiment of the present invention. Arbiter 16 utilizes table 30 to generate a queue of requests 14, and selects arbitration-winning request 18 from the top of the queue. In order to generate table 30, as each request 14 comes from a specific client 12, data is entered into a respective client row 32. Each client row 32 comprises a client identity field 34, wherein is entered an identifier of the specific client, and a number-of-requests field 36, wherein is entered the number of requests 14 to access resource 20 which have not been implemented for the client. Each client row 32 further comprises a next-client field 38, wherein is entered the identity of a subsequent client. The subsequent client in a specific row 32 is the client who is to be selected as the arbitration-winning client after the client of the row has completed having access to resource 20.

Arbiter 16 further comprises list-terminating pointer fields 41, comprising a tail pointer data field 42 and a head pointer data field 44, which, together with the data in table 30, are used by arbiter 16 to generate a linked-list of requests 14. Head pointer data field 44 contains the identity of a first client in the list, i.e., the client who currently has access to resource 20. Tail pointer data field 42 contains the identity of a last client in the list. Thus, head pointer data field 44, next-client fields 38, and tail pointer data field 42 form a set of parameters which generate a unique linked-list of requests 14. Tail pointer data field 42 is read by a subsequent client when the subsequent client comes into the system. The tail pointer data field is then updated to show the identity of the subsequent client.

Figure 2B:
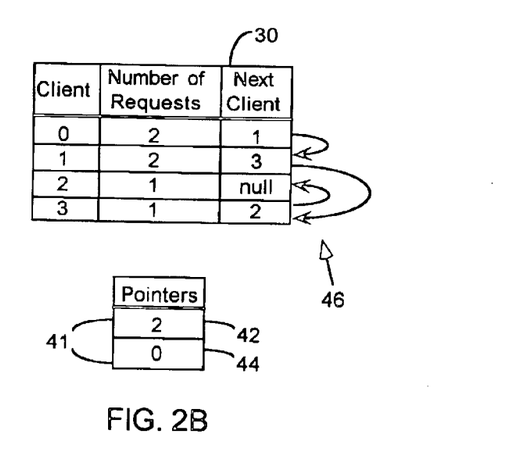
FIG. 2B is a schematic diagram showing an example of the construction of a linked-list from the table of FIG. 2A, according to a preferred embodiment of the present invention.

FIG. 2B is a schematic diagram showing an example of the construction of a linked-list from table 30, according to a preferred embodiment of the present invention. Head pointer 44 has an entry 0, showing that client 0 is the first client in the list maintained by arbiter 16. From table 30, the subsequent client to client 0 is client 1, as shown in the next-client field of client 0. Similarly, the subsequent client to client 1 is client 3, and the subsequent client to client 3 is client 2. Client 2 is the last client, as shown by tail pointer field 42. Thus the linked-list constructed from table 3, shown by arrows 46, is [0, 1, 3, 2].

Logic circuitry 17 (FIG. 1) performs four logic tasks, described in Table I hereinbelow.

TABLE I

| Task | Conditions for Task to be Performed | Actions Performed |
|---|---|---|
| A | A request is received from a requesting client when the requesting client has no pending request. | 1. Add the requesting client to the client identity list by setting the value of the number-of-requests field 36 for the requesting client to 1. Update the linked-list as follows: 2. Set next-client field 38 of last client in list, as pointed to by tail pointer field 42, to identity of requesting client. (Except when there are no other clients in list, in which case there is no last client so do nothing.) 3. Update tail pointer field 42 to identity of requesting client. |
| B | A request is received from a requesting client when the client requesting already has a pending request. | Increment number-of-requests field 36 for requesting client. |
| C | An arbitration-winning client is given access to the resource. The client still has a pending request after this request is completed. | 1. Set head pointer to identity of client. When service is complete, move pending request of client to end of list as follows: 2. Delete identity of client from head pointer field 44. 3. Decrement the number-of-requests field 36 of client. 4. Set next-client field 38 of last client in list, as pointed to by tail pointer field 42, to identity of requesting client. 5. Set tail pointer to client identity. 6. Set next-client field 38 of client to null. |
| D | An arbitration-winning client is given access to the resource. The client has no pending requests | 1. Set head pointer to identity of client. When service is complete, remove client from list as follows: 2. Delete identity of client from head pointer field 44. |

TABLE I-continued

| Task | Conditions for Task to be Performed | Actions Performed |
|---|---|---|
| | after this request is completed. | 3. Set number-of-requests field 36 of client to 0.<br>4. Set next-client field 38 of client to null. |

Figure 3:
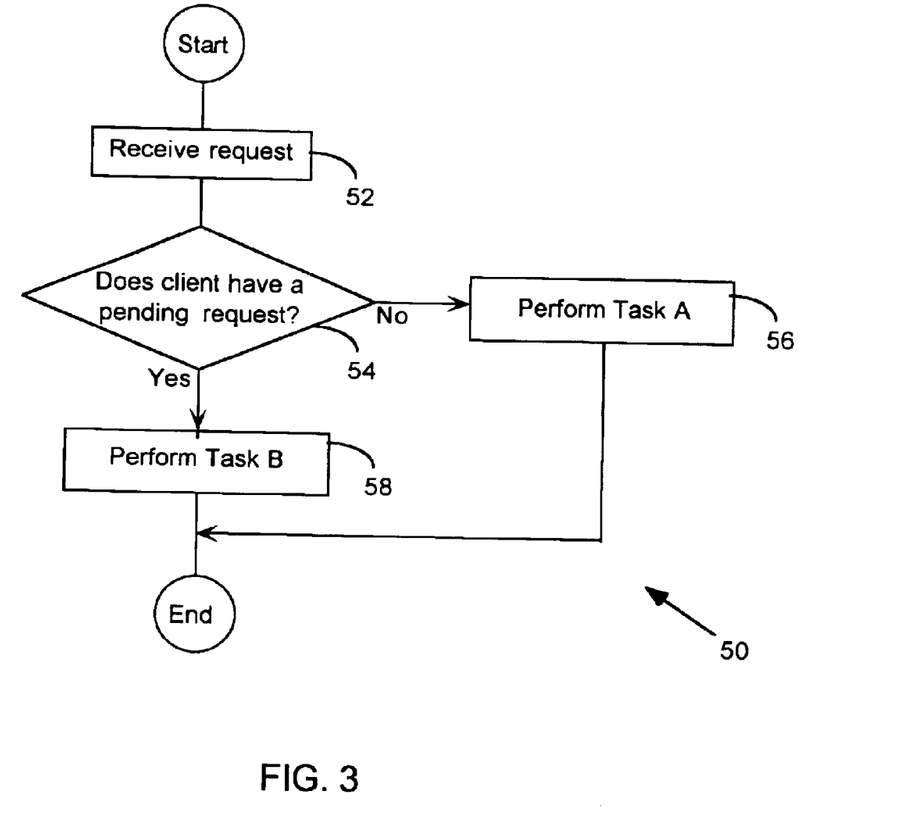
FIG. 3 is a flow chart showing a request-sorting process followed by logic circuitry in the arbiter, according to a preferred embodiment of the present invention.

FIG. 3 is a flow chart showing a request-sorting process 50 followed by logic circuitry 17, according to a preferred embodiment of the present invention. Process 50 is most preferably followed when no two requests from clients 12 arrive at arbiter 16 at substantially the same time, and when all requests from clients 12 have substantially equal priorities. Process 50 includes tasks A and B, as described above in Table I. In a receive request step 52, logic circuitry 17 receives a request for access to resource 20 from a specific client 12, herein termed client N. In a decision step 54, the logic checks within the contents of table 30 if client N has a pending request. If client N does not have a pending request, in an add-client step 56 logic circuitry 17 adds client N as a new client to field 34 and sets the Number of Requests equal to 1 in field 36, by performing task A. Also in step 56, tail pointer data field 42 is set to N, so that the list of requests is updated to end with client N. If client N does have a pending request, in a request-increment step 58 the number-of-requests field of client N is incremented by performing task B.

Figure 4:
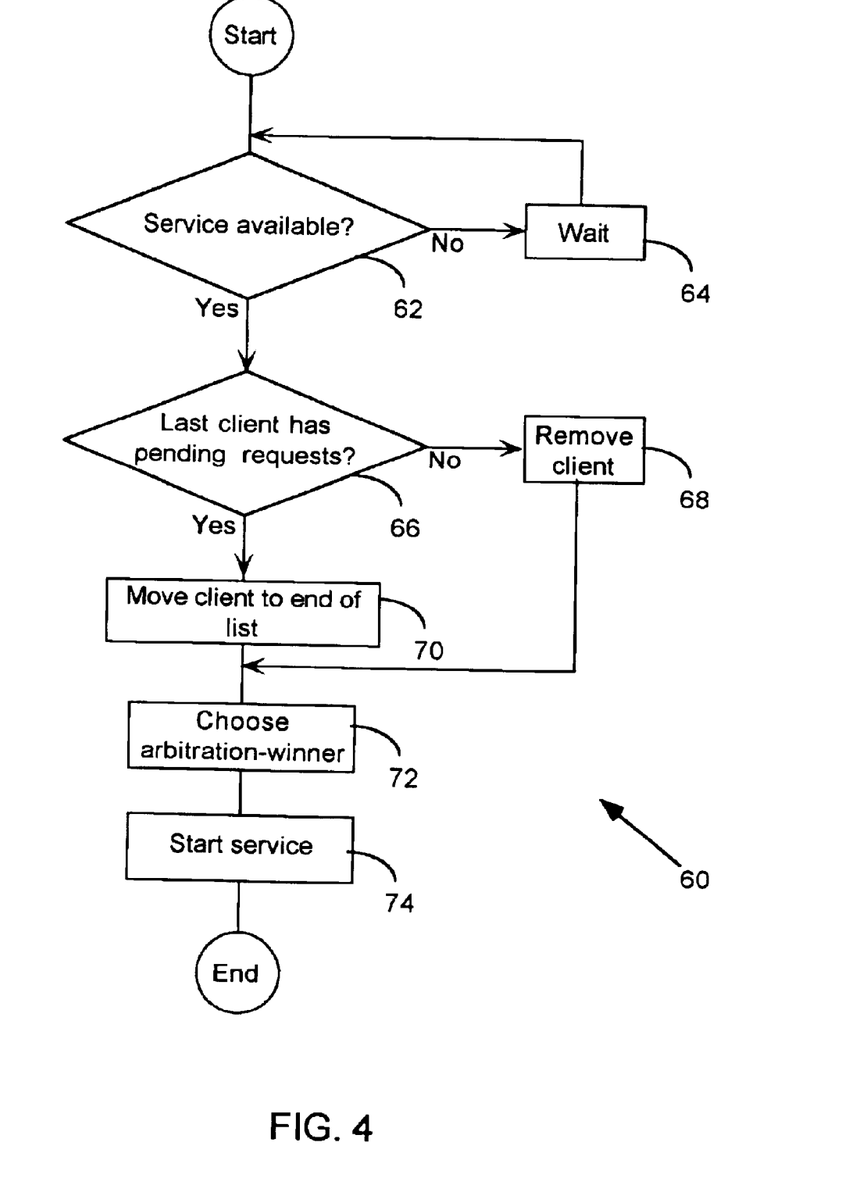
FIG. 4 is a flow chart showing a service-allocation process followed by logic circuitry in the arbiter, according to a preferred embodiment of the present invention.

FIG. 4 is a flow chart showing a service-allocation process 60 followed by logic circuitry 17, according to a preferred embodiment of the present invention. Most preferably, process 60 is implemented by logic circuitry 17 substantially in parallel with process 50. Process 60 is implemented by circuitry 17 except at initialization of system 10. At initialization, i.e., when arbiter 16 receives a first request for access to resource 20, task A and the first part of task D in table I are performed.

In a first decision step 62, logic circuitry 17 checks to see if resource 20 is available to provide its service. If the resource is not available, the logic circuitry waits in a holding loop 64.

When resource 20 is available, in a second decision step 66 logic circuitry 17 checks to see if the client who has finished using resource 20 has pending requests. If the client does not have pending requests, the client is removed from table 30 in a remove client step 68 by implementing parts 2, 3, and 4 of task D (Table I). If the client does have pending requests, the client is moved to the end of the linked-list of table 30 in an update list step 70, by implementing parts 2, 3, 4, and 5 of task C.

In a choose-arbitration-winner step 72, logic circuitry 17 utilizes table 30 to find the client at the head of the list, which arbitration-winning client is then given access to resource 20. Once the arbitration-winning client is chosen, in a start service step 74 head pointer is set to the identity of the arbitration-winning client, corresponding to part 1 of task C or task D, and service to the client begins.

Figure 5:
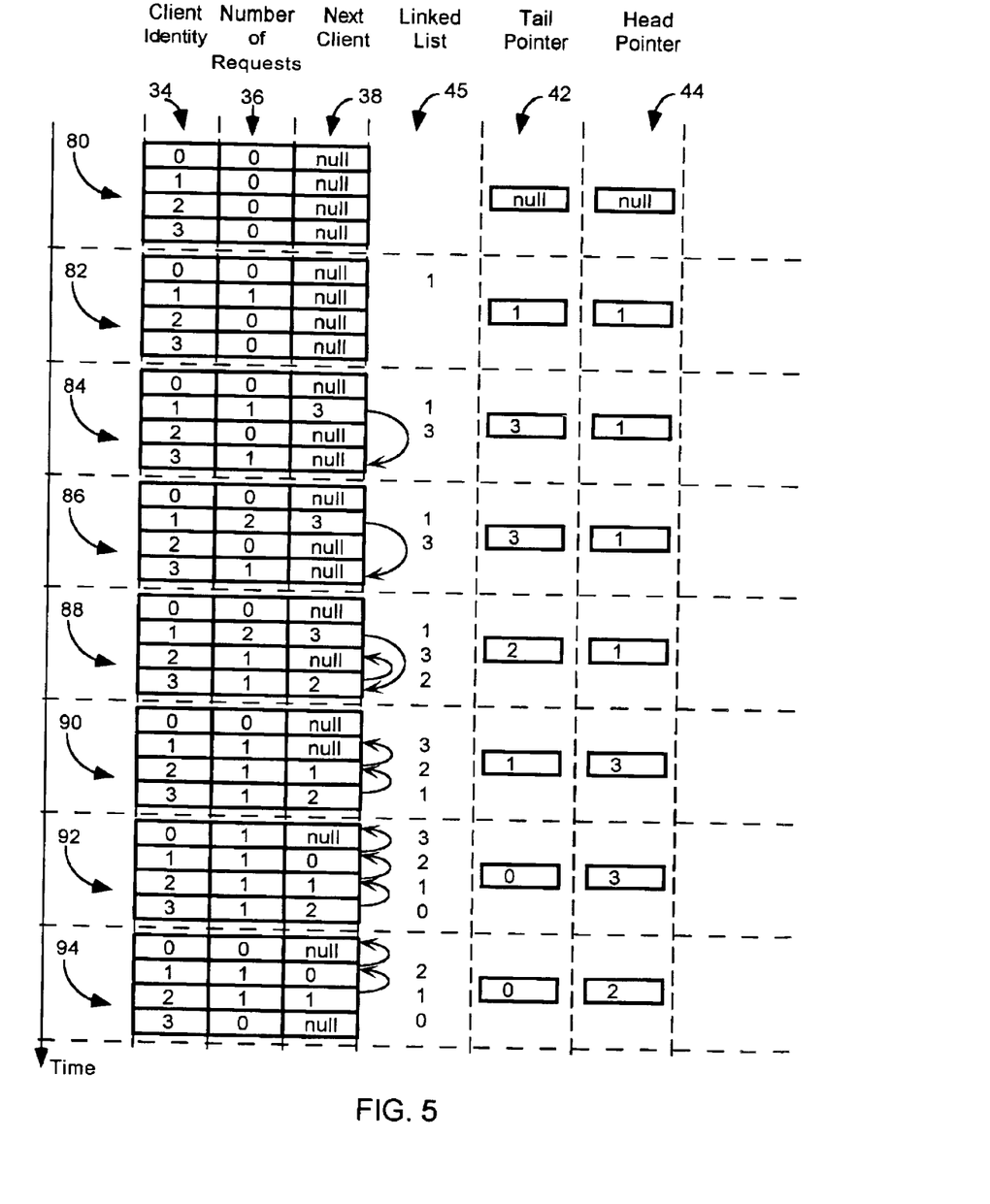
FIG. 5 shows examples of contents of the table and list-terminating pointers in the arbiter, according to a preferred embodiment of the present invention.

FIG. 5 shows examples of contents of table 30 and head pointer field 44 and tail pointer field 42, according to a preferred embodiment of the present invention. The examples shown in FIG. 5 occur sequentially in time as process 50 and process 60 are followed by arbiter 16. In FIG. 5 table 30 is shown for clarity as constant in size, but it should be understood that where number-of-requests field 36 of a specific client is set to 0, this corresponds to the absence or removal from table 30 of the specific client.

In a first example 80, all number-of-requests fields 36 are set to 0, and all next-client fields 38 are set to null, corresponding to the start of process 50. In an example 82, a first request to arbiter 16 is received from client 1. Since client 1 has no pending requests arbiter 16 performs task A, i.e., number-of-requests field 36 for client 1 is updated to 1, next-client field 38 stays at null, and tail pointer field 42 is set to 1. Arbiter 16 checks if resource 20 is available, and since it is available, client 1 is given access to resource 20 so that service starts. Since this is the first request, task D applies, so that the first part of task D is implemented, i.e., head pointer 44 is set to 1 showing that client 1 is now using resource 20.

In an example 84, arbiter 16 receives a request from client 3, while client 1 continues to be served. Since client 3 has no pending requests arbiter 16 performs task A, i.e., number-of-requests field 36 for client 3 is set to 1, next-client field 38 of the last client in list (client 1) is set to the identity of requesting client 3 and tail pointer field 42 is set to 3. Linked-list [1, 3] is formed, as shown in a linked-list column 45.

In an example 86, arbiter 16 receives a request from client 1, while client 1 is still continuing to be served from its previous request. Since client 1 has a pending request, arbiter 16 performs task B. Thus number-of-requests field 36 for client 1 is updated to 2 and linked-list [1, 3] remains.

In an example 88, arbiter 16 receives a request from client 2, while client 1 continues to be served. Since client 2 has no pending requests arbiter 16 performs task A, i.e., number-of-requests field 36 for client 2 is set to 1, next-client field 38 of the last client in the list (client 3) is set to the identity of requesting client 2, and tail pointer field 42 is set to 2. Thus the linked-list becomes [1, 3, 2].

In an example 90, client 1 finishes using resource 20, but still has a pending request. Thus parts 2, 3, 4, and 5 of task C apply, i.e., head pointer field 44 is changed from 1, number-of-requests field 36 for client 1 is decremented from 2 to 1, tail pointer field 42 is set to 1, and next-client field 38 of client 1 is set to null. Resource 20 becomes available for the next client, i.e., client 3, on the list. Client 3 becomes the arbitration-winning client, and begins to receive service. Client 3 has no pending requests after this request is completed. Thus, arbiter 16 performs part 1 of task D, i.e., head pointer field 44 is set to 3.

In an example 92, arbiter 16 receives a request from client 0, while client 3 continues to be served. Since client 0 has no pending requests arbiter 16 performs task A, i.e., number-of-requests field 36 for client 0 is set to 1, next-client field 38 of the last client in the list (client 1) is set to the identity of requesting client 0, and tail pointer field 42 is set to 0. The linked-list becomes [3, 2, 1, 0].

In an example 94, client 3 finishes using resource 20, and has no pending requests remaining. Thus parts 2, 3, and 4 of task D apply, i.e., head pointer field 44 is changed from 3, number-of-requests field 36 for client 3 is decremented from 1 to 0, and next-client field 38 of client 3 is set to null. Resource 20 becomes available for the next client, i.e., client 2, on the list. Client 2 becomes the arbitration-winning client, and begins to receive service. Client 2 has no pending requests after this request is completed. Thus, arbiter 16 performs part 1 of task D, i.e., head pointer field 44 is set to 2, and the linked-list becomes [2, 1, 0].

Figure 6:
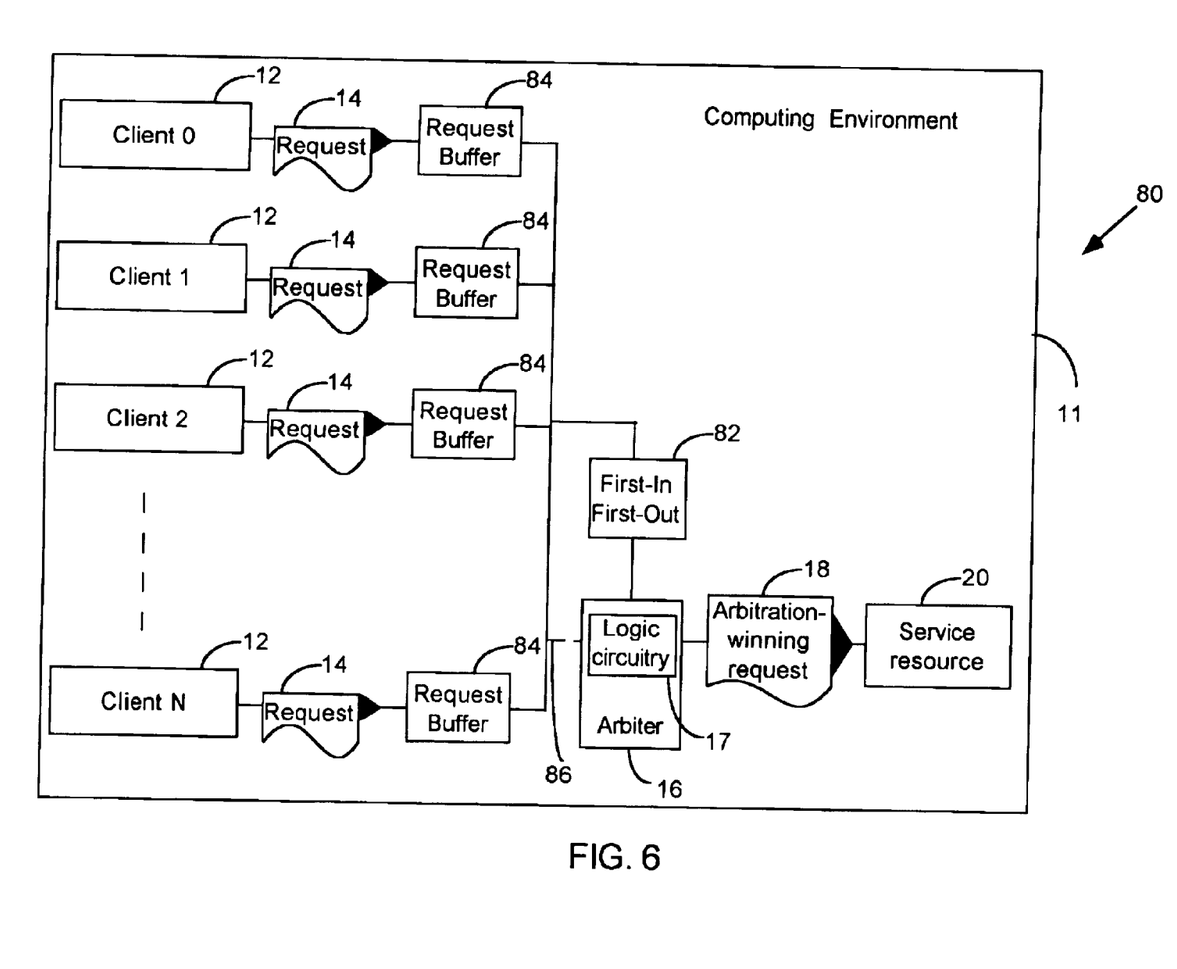
FIG. 6 is a schematic block diagram of an alternative arbitration system, according to a preferred embodiment of the present invention.

FIG. 6 is a schematic block diagram of an arbitration system 80, according to an alternative preferred embodiment of the present invention. Apart from the differences described below, the operation of system 80 is generally similar to that of system 10 (FIGS. 1, 2A, 2B, 3, 4, and 5) wherein elements indicated by the same reference numerals in both systems 80 and 10 are generally identical in construction and in operation. Requests 14 in system 80, unlike requests 14 in system 10, are not necessarily generated at different times. A first-in first-out (FIFO) memory 82 is positioned before arbiter 16 to receive all requests 14. Most preferably, FIFO 82 is able to operate at a significantly faster clock rate than arbiter 16, and so is able to distinguish requests 14 which appear to arbiter 16 to be simultaneous. As requests 14 are received by FIFO 82, they are stored sequentially in the FIFO and are then read sequentially from the FIFO by arbiter 16, which operates substantially as described above for system 10.

In some preferred embodiments of system 80, one or more clients 12 have a request buffer 84 placed between the respective client 12 and FIFO 82, which buffers are clocked so that requests from clients 12 do not enter FIFO 82 simultaneously. Alternatively, request buffers 84 replace FIFO 82 and are connected directly to arbiter 16, as shown by a broken line 86 in FIG. 6, in which case the buffers are clocked so that requests from their respective clients do not arrive simultaneously at arbiter 16.

Figure 7:
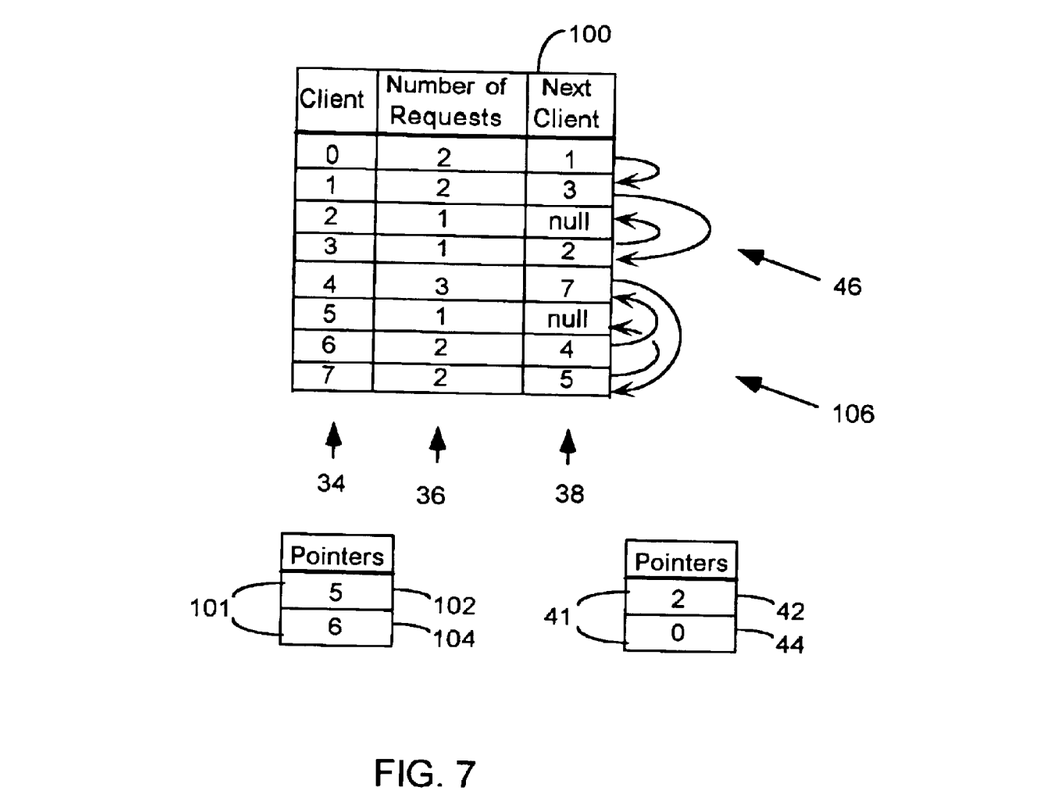
FIG. 7 is a schematic diagram of an alternative data structure table and additional list-terminating pointer fields implemented in an arbiter, according to a preferred embodiment of the present invention.

FIG. 7 is a schematic diagram of an alternative data structure table 100 and additional pointer fields 101 implemented in arbiter 16, according to a preferred embodiment of the present invention. Apart from the differences described below, the implementation of data structure table 100 and pointer fields 101 is generally similar to that of data structure table 30 and pointer fields 41 (FIGS. 2A and 2B) wherein elements indicated by the same reference numerals in both table 100 and table 30 and in pointers 101 and pointers 41 are generally identical in operation. Most preferably, table 100 and pointers 101 are implemented when requests 14 have different priorities, and table 100 preferably comprises a priority column 103, containing a priority for each client in the table. In FIG. 7 it is assumed that clients 0, 1, 2, and 3 are assigned a priority A, and that clients 4, 5, 6, and 7 are assigned a priority B. Preferably, arbiter 16 is informed by a specific client 12 of the priority assigned to the requests of the client. Alternatively, arbiter 16 is informed of the priority of requests from a client by another method, such as by computing environment 11 notifying the arbiter.

Pointers 41 are used to define a priority-A-linked-list of clients with priority A by maintaining the start and end of the priority-A-linked-list in fields 42 and 44 respectively, as described above with reference to FIGS. 2A and 2B. Pointers 101, comprising a priority B tail pointer 102 and a priority B head pointer 104, are used to define a priority-B-linked-list of clients with priority B by maintaining the start and end of the priority-B-linked-list in fields 102 and 104 respectively. Within each linked-list, the generation of the remainder of the list is substantially as described above with reference to FIGS. 2A and 2B. Thus, in table 100 the priority-A-linked-list, shown by arrows 46, starts with client 0 and ends with client 2 to form linked-list [0, 1, 3, 2]. The priority-B-linked-list is shown by arrows 106. The priority-B-linked-list starts with priority B tail pointer 102, i.e., client 6, and ends with priority B head pointer 104, i.e., client 5, to form linked-list [6, 4, 7, 5]. It will be appreciated that while table 100 and pointers 41 and 101 define two linked-lists, any number of linked-lists can be defined within table 100 by adding in more sets of head and tail pointers, since each set of head and tail pointers defines an independent linked-list.

In order to update table 100 as each request 14 is received, arbiter 16 decides which priority the request is to be assigned to and follows process 50 (described with reference to FIG. 3 hereinabove) for clients in table 100 with that priority. Thus, each linked-list in table 100 is updated when a request having the same priority as the linked-list is received.

Figure 8:
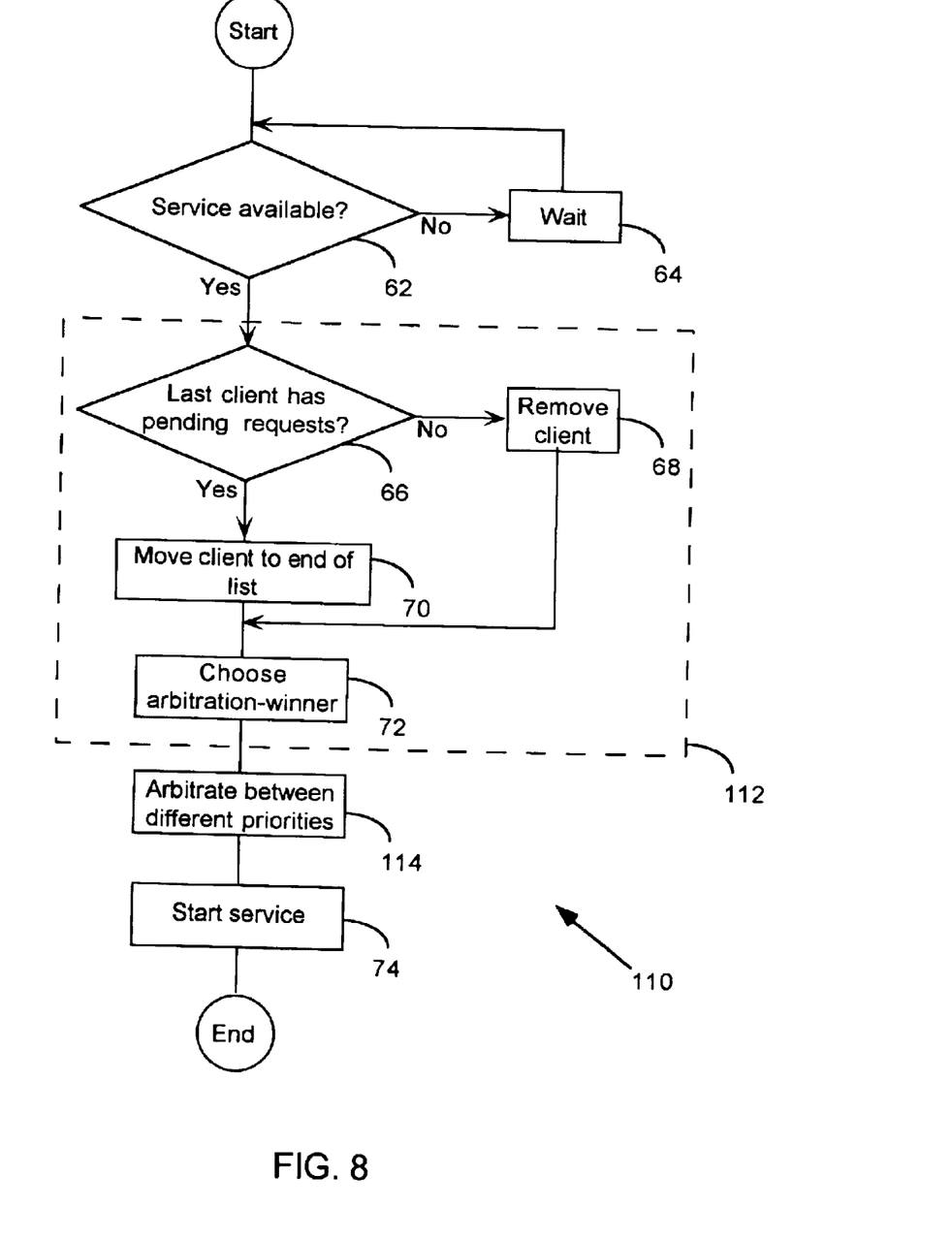
FIG. 8 is a flow chart showing a service-allocation process followed by an arbiter when requests having multiple properties are received, according to a preferred embodiment of the present invention.

FIG. 8 is a flow chart showing a service-allocation process 110 followed by arbiter 16 when requests having multiple priorities are received, according to a preferred embodiment of the present invention. In process 110, steps 62, 64, 66, 68, 70, 72, and 74 are substantially as described above with reference to process 60 (FIG. 4). After receiving a positive answer in decision step 62, arbiter 16 follows steps 66, 68, 70, and 72, as shown within a dashed rectangle 112, having regard only to clients in table 100 with the priority, herein termed the current priority, of the client who has finished using the resource. After completion of choose-arbitration-winner step 72 for the current priority, in a second-arbitration step 114 arbiter 16 selects the clients at the head of each priority list. For example, if table 100 at the end of step 72 is as shown in FIG. 7, the clients would be client 0 and client 6. In second-arbitration step 114 arbiter 16 then performs an additional arbitration between these clients, according to one of the arbitration methods known in the art. For example, arbiter 16 chooses which client has been waiting the greatest time for resource 20. Start service step 74 is then applied to the client chosen in step 114, and process 110 terminates.

It will be further appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. An arbiter which arbitrates between a plurality of clients generating requests for access to a resource in a computing environment, comprising:

a memory, comprising for each of the plurality of clients:
   a request register, which is adapted to record a number of the client's access requests; and
   a next-client pointer, which is adapted to record an identification of another one of the clients making a subsequent request to access the resource, so as to form a linked list of the requests; and logic circuitry which is adapted to update the linked list in response to the number of access requests of each of one or more of the clients, and which is adapted to perform an arbitration between the plurality of clients, responsive to the linked list and to the number of the access requests recorded in the request register, and to decide, responsive to the arbitration, which of the plurality of clients is given access to the resource.

2. An arbiter according to claim 1, wherein the memory comprises at least one list-terminating pointer which indicates an end of the linked list.

3. An arbiter according to claim 2, wherein the at least one list-terminating pointer comprises a tail pointer which indicates a last client in the linked list.

4. An arbiter according to claim 2, wherein the at least one list-terminating pointer comprises a head pointer which indicates a first client in the linked list, and wherein the logic circuitry is operative to decide, responsive to the head pointer, which of the plurality of clients is given access to the resource.

5. An arbiter according to claim 1, wherein the logic circuitry is operative to check whether a client requesting access to the resource has a pending access request, and to update the number of access requests of the client requesting access responsive to the check.

6. An arbiter according to claim 1, wherein the logic circuitry is operative to check whether the resource is available, and to allocate the resource responsive to the check.

7. An arbiter according to claim 1, and comprising at least one buffer wherein requests from a specific client are stored before the number of the requests of the specific client are recorded in the request register of the specific client.

8. An arbiter according to claim 1, and comprising a first-in first-out memory wherein requests from the plurality of clients are stored before being transferred sequentially to the memory and the logic circuitry.

9. An arbiter according to claim 1, wherein the memory comprises:

for at least some of the clients, a priority flag which is adapted to record a priority for access to the resource for the at least some clients; and at least one list-terminating pointer for the priority, which indicates an end of the linked list for the at least some clients.

10. An arbiter according to claim 9, wherein the logic circuitry is adapted to decide, responsive to the linked list and the priority flag, which of the clients is given access to the resource.

11. An arbiter according to claim 1, wherein the logic circuitry is of a size that is independent of a quantity of clients served by the arbiter, and wherein the circuitry is adapted to decide, responsive to the numbers of recorded requests, which of the plurality of clients is given access to the resource.

12. An arbiter according to claim 1, wherein a size of the memory scales as a product of the number of clients and a logarithm of the number of clients.

13. A method for arbitrating between a plurality of clients generating requests for access to a resource in a computing environment, comprising:

for each of the plurality of clients, recording a number of the client's access requests in a respective, dedicated memory register;

recording for each of the clients, responsive to the requests, a next-client pointer to a subsequent one of the clients requesting the resource, so as to form a linked list of the clients;

updating the linked list in response to the number of access requests of each of one or more of the clients, so as to generate an updated linked list;

performing an arbitration between the plurality of clients in response to the updated linked list and to the number of the access requests recorded in the memory registers; and giving one of the clients access to the resource responsive to the arbitration.

14. A method according to claim 13, wherein recording the next-client pointer comprises pointing to an end of the linked list with a list terminating pointer.

15. A method according to claim 14, wherein pointing to the end of the linked list comprises pointing to a last client in the linked list with a tail pointer.

16. A method according to claim 14, wherein pointing to the end of the linked list comprises pointing to a first client in the linked list with a head pointer, and wherein giving the clients access to the resource comprises giving the clients access to the resource responsive to the head pointer.

17. A method according to claim 13, wherein recording the number of the client's access requests comprises checking if a client requesting access to the resource has a pending request, and updating the number in the memory register of the client requesting access responsive to the check.

18. A method according to claim 13, wherein giving the clients access comprises checking whether the resource is available, and allocating the resource responsive to the check.

19. A method according to claim 13, wherein recording the number of the client's access requests comprises providing at least one buffer and storing the requests from the client in the buffer prior to recording the number of the client's access requests.

20. A method according to claim 13, wherein giving the clients access comprises assigning priorities to at least some of the clients, and forming a linked list of the prioritized clients.

21. A method according to claim 20, wherein giving the clients access to the resource comprises deciding, responsive to the assigned priorities and the linked list, which of the clients is given access to the resource.

22. A method for arbitrating between a plurality of clients generating requests for access to a resource in a computing environment, comprising:

for each of the plurality of clients, recording a number of the client's access requests;

forming a linked list of the clients, responsive to the number of requests;

providing logic circuitry of a size that is independent of a quantity of the plurality of clients; and utilizing the logic circuitry to perform an arbitration between the plurality of clients, responsive to the linked list and the number of recorded requests, and to decide, responsive to the arbitration, which of the plurality of clients is given access to the resource.

23. The arbiter according to claim 1, wherein the request register is adapted to decrement's access requests on completion of a previous request comprised therein, and to increment the number on receipt of a further access request from the client.

24. The method according to claim 13, and comprising, for each of the plurality of on completion of a previous request comprised in the client's access requests, and incrementing the number on receipt of a further access request from the client.

* * * * *

UNITED STATES PATENT AND TRADEMARK OFFICE
CERTIFICATE OF CORRECTION

PATENT NO. : 6,829,647 B1
DATED : December 7, 2004
INVENTOR(S) : Giora Biran et al.

It is certified that error appears in the above-identified patent and that said Letters Patent is hereby corrected as shown below:

Tilte page,
Item [75], Inventor, please delete "Tai Sostheim, Kiryat Tivan (IL)" and substitute with -- Tal Sostheim, Kiryat Tivan (IL) --.

Signed and Sealed this

Twenty-second Day of March, 2005

JON W. DUDAS
*Director of the United States Patent and Trademark Office*